Feb. 19, 1935.  J. L. TAYLOR  1,991,826
DYNAMOMETER
Filed Oct. 24, 1931
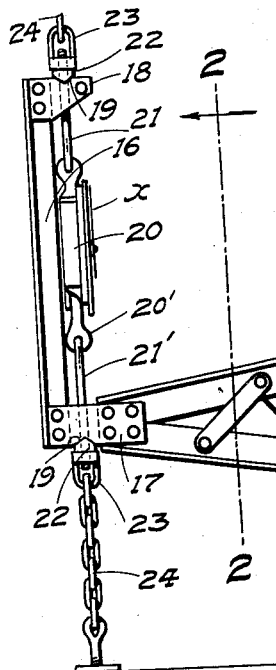
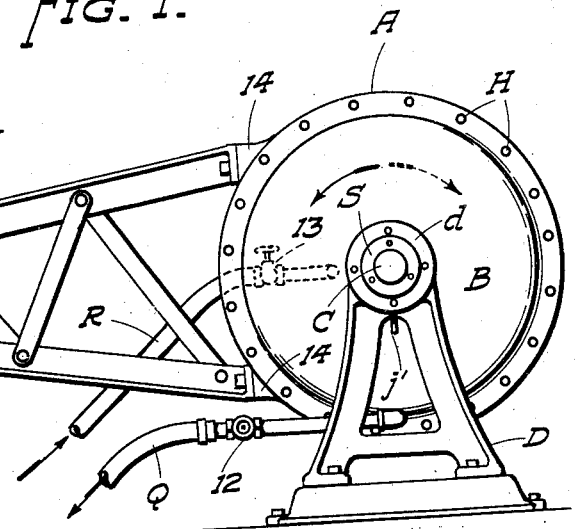
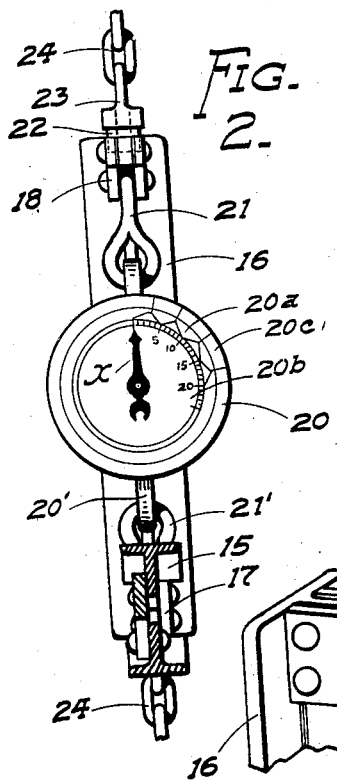
FIG. 1.
FIG. 2.
FIG. 3.
INVENTOR:
John Leonard Taylor.
BY:
ATTORNEY.

Patented Feb. 19, 1935

1,991,826

UNITED STATES PATENT OFFICE 1,991,826

DYNAMOMETER

John Leonard Taylor, Milwaukee, Wis.

Application October 24, 1931, Serial No. 570,943

6 Claims. (Cl. 265—24)

This invention relates to dynamometers or other force measuring devices, and an object of the invention is to generally improve the construction and operation of devices of this class.

A further object is to provide improved means for indicating the torque being developed in a dynamometer.

More particularly, an object is to provide a device for indicating developed torque without regard for the direction of rotation of the device driving the dynamometer.

A further object is to provide a device for indicating a force in one direction and which will indicate equally well a force acting in the opposite direction, and further objects are to provide the following:

Such a device which may be assembled from standard parts. Such a device including as a part thereof a scale device of standard construction, and other objects and advantages which will appear from the following specification in which:

Fig. 1 is an elevation of an illustrative embodiment of the invention.

Fig. 2 is a section on line 2—2 of Fig. 1.

Fig. 3 is a perspective view of a bracket or abutment element seen in Figs. 1 and 2.

Similar reference characters apply to like parts in all the figures aforesaid.

The illustrative device, as particularly shown in Fig. 1 includes in the present instance a dynamometer or brake device generally denoted by "A", in the present instance of hydraulic type, although other brake means, or other sources of force to be measured are contemplated, the particular source of such force forming no part of the present invention. The brake itself will therefore not be described except to say that the casing A constitutes a stator within which operates a rotor of suitable or well known type, the same being mounted on a shaft C which is coupled to a device or power source to be tested not shown. Stator A is journaled on suitable trunnions projecting therefrom and supported in pillow blocks or bearings d supported on pedestals D, the shaft C being suitably journaled in the trunnions in any suitable or well known manner. The casing is provided with an outlet pipe Q and an inlet pipe R which are arranged for providing a flow of fluid through the apparatus for furnishing a resistance to the movement of the rotor and for carrying away the heat developed in the brake, the flow of fluid being regulated by valves 12 and 13 interposed in the respective pipes. The pipes are preferably flexible to give freedom for slight movement of the stator A, or other suitable or well known expedients may be adopted for this purpose.

Suitable abutment lugs 14 are arranged upon casing A to which is attached a beam or lever arm 15 which in turn supports a substantially vertically disposed staff 16. The said staff is provided with pairs of spaced plates 17 and 18 that form brackets or abutments providing opposed notches 19—19', more particularly shown in Fig. 3. A suitable spring scale 20, equipped with a specially graduated dial as shown, is suspended between the plates 17—18, by means of eyelet or hook links 21—21'. The links are threaded in the present instance to accommodate knife-edge or other suitable bearing nuts or stops 22 which register with the aforesaid notches, and are locked on the said links by eyelet-nuts 23 which in turn are connected with chains 24—24. The chains are attached to suitable floor and ceiling, or equivalent anchorages, for suspending the scale 20 preferably medially between the plates 17 and 18. With the shaft C coupled to an engine or other unit to be tested, the casing A will oscillate slightly as indicated by the full or dotted arrow upon operation of the unit in one or the other direction, which movements will rock the arm 15 up or down, thereby creating a pull on the links 21—21', thus affecting the scale 20. The pointer X moves in the present instance in a clockwise direction only, and indicates in foot-pounds or other desired values, it being contemplated that the dial shall be graduated to indicate brake horse-power directly for one or more selected speeds of the prime mover, and the reading may be taken equally well with the unit rotating in either direction. The device indicates directly the "brake horse-power" in contra-distinction to the indicated or theoretical horse-power.

Movement of the casing A in the direction of the full arrow will exert a downward pull on link 21' through bracket 17 and lower stop 22, rotating the scale pointer X. With a reverse movement of the casing, as in the direction of the dotted arrow, the pull will be on link 21, through bracket 17, staff 16, bracket 18, and upper stop 22, raising the body portion of scale 20, any substantial movement being prevented by lug 20', which latter is held substantially stationary by the link 21' and lower chain 24, relative movement between the body portion and lug actuating the scale pointer as before.

The scale dial may be graduated as desired, but is preferably divided into substantially concentric areas to permit direct reading of the brake horse-power for various speeds of the prime mover. The inner graduations 20$^b$ preferably indicate pounds or foot-pounds, while, for example, the spaces 20$^a$ and 20$^c$ indicate horse-power at 600 R. P. M., 900 R. P. M., respectively, or at other desired rotative speeds. Additional circles may be added to the dial within the contemplation of the invention whereby to increase the range of speeds from which direct power readings may be taken. This feature of the invention permits readings of power output to be taken directly in most instances, the prime mover being brought to one of the predetermined speeds indicated on the dial, and the horsepower read directly with any desired degree of braking resistance.

The use of this dial substantially reduces the chance of error in horse-power determinations, since practically all the calculation heretofore necessary in obtaining brake horse-power with known apparatus is eliminated, it being possible to interpolate with considerable accuracy for values not found directly on the dial, either torque indications or speeds. Accurate results may accordingly be obtained by relatively unskilled operators, and errors on the part of skilled operators are eliminated with this apparatus.

The above is a complete disclosure of an illustrative embodiment of the invention, but it is to be understood that it is exemplary only, the invention not being considered as limited to anything disclosed therein, or in fact in any manner except as set forth in the following claims.

What is claimed as new and desired to be secured by Letters Patent of the United States is:

1. In a force measuring means the combination of a rotor and a stator, said stator disposed to be urged in a rotative direction by said rotor, a lever arm extending from said stator and rigidly fixed therewith, a staff coupled with said lever arm and extending substantially at right angles thereto and having opposed brackets fixed therewith, a scale device supported between said brackets, means supporting said scale device independently of said brackets, means connected with said scale device for engaging one of said brackets when said lever arm is urged in one direction, and the other of said brackets when said lever arm is urged in the opposite direction, and connections from the last mentioned means operative to actuate said scale in an indicating direction when said means is engaged by either of said brackets.

2. In a force measuring means the combination of an oscillatory force receiving body, an arm fixed with said body and extending substantially radially therefrom, a staff member coupled to said arm and substantially perpendicular thereto, spaced knife-edge rests oppositely arranged on said member, a force measuring scale device disposed intermediate said rests, means independent of said rests arranged to support said scale device therebetween, actuating means connected with said scale device engaging one of said rests when said body is oscillated in one direction, and the other of said rests when said body is oscillated in the opposite direction and connections from the last mentioned means operative to actuate said scale in an indicating direction when said means is engaged by either of said rests.

3. In a force measuring means the combination of a dynamometer arm, a staff carried by said arm and substantially perpendicular thereto, a force measuring scale device; a scale supporting harness anchored above and below said scale independently of said staff, opposed spaced abutments fixed with said staff, stop means connected with said scale device and arranged to lie in the path of said abutments when said arm is moved, said means engaging one of said stops when said arm is moved in one direction and the other of said stops when said arm is moved in the other direction, and connections from said stop means operative to actuate said scale device in the same direction whichever of said abutments engages said stop means.

4. In a force measuring means the combination of a movable member, and a scale device, spaced abutments carried by said member, said scale device including a body element and an actuating element, said elements being relatively movable for actuation of said scale device, means connected with one of said elements for supporting said scale device independently of said movable member, connections from the other element to a substantially rigid anchorage, means on one of said elements engaging one of said abutments, and means on the other element engaging the other abutment, whereby said scale device is actuated in an indicating direction upon movement of said movable member in either direction.

5. In a force measuring means the combination of a movable member, and a scale device, said scale device including a body element and actuating element, said elements being relatively movable for actuation of said scale device in an indicating direction, means operative to support said scale device independently of said movable member, a stop member fixed with one of said elements and another stop member fixed with the other element, said members being spaced apart and so disposed that one of said stops is contacted by said movable member upon movement in one direction, and the other of said stops is contacted by said movable member upon movement in the opposite direction, whereby movement of said movable member in either direction actuates said scale device in an indicating direction.

6. In a dynamometer the combination of a rotor and a stator, a lever arm extended from said stator and a scale device connected to be actuated from said arm, said scale device including a body element and actuating element, said elements being relatively movable for actuating said scale device, means connected with one of said elements for supporting said scale device independently of said movable member, connections from the other element to a substantially rigid anchorage, spaced abutments carried by said lever arm, means on one of said elements for engaging one of said abutments, and means on the other element for engaging the other abutment, a dial on said body element, and an index, said dial and index being relatively movable, indicia on said dial cooperating with said index to indicate units of force developed in said lever arm, said dial also having indicia correlated with the above mentioned indicia to indicate power absorbed at various speeds by said dynamometer, and connections from said relatively movable elements arranged to cause relative movement between said index and said dial in response to relative movement between said elements.

JOHN LEONARD TAYLOR.